Feb. 17, 1953      D. V. SUMMERVILLE      2,628,850
RELEASABLE CONDUIT CONNECTION WITH AUTOMATIC VALVING
Filed March 19, 1949

INVENTOR
Donald V. Summerville
BY
Bean, Brooke, Buckley & Bean.
ATTORNEYS

Patented Feb. 17, 1953

2,628,850

UNITED STATES PATENT OFFICE 2,628,850

RELEASABLE CONDUIT CONNECTION WITH AUTOMATIC VALVING

Donald V. Summerville, Fort Erie, Ontario, Canada

Application March 19, 1949, Serial No. 82,325

1 Claim. (Cl. 284—4)

This invention relates to fluid conduit connection devices, and more particularly to improvements in releasable conduit couplings embodying automatic valve devices therein, whereby when the coupling is disconnected the valve means operates automatically to fluid-seal the two parts of the coupling, and reopens automatically upon reconnection of the coupling. For example, the invention is applicable to provide an improved fluid jack insert box for use as a connection device between pilot-carried equipment and fixed aircraft equipment.

One of the objects of the invention is to provide an improved detachable conduit connection device of the character aforesaid.

Another object of the invention is to provide an improved jack insert box for use in aircraft fluid conduit systems.

Another object of the invention is to provide an improved jack insert box device which prohibits unintended disconnection thereof.

Another object of the invention is to provide an improved detachable locking means in conduit connection devices and the like.

Another object of the invention is to provide an improved valve device in automatically closing detachable coupling devices for fluid conduits and the like.

Other objects and advantages of the invention will appear in the specification hereinafter.

Figure 1:
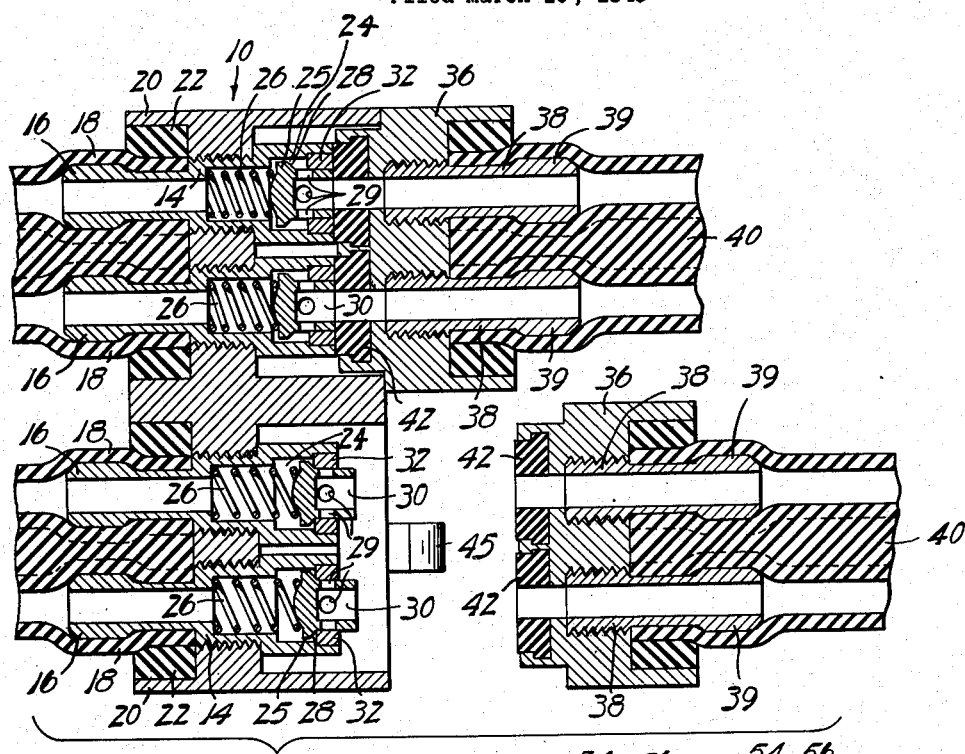
Fig. 1 is a fragmentary horizontal section through a double duplex conduit connection device of the invention; showing one duplex conduit coupling device in connected condition and the other duplex conduit coupling device in disconnected condition.
Figures 2, 3:
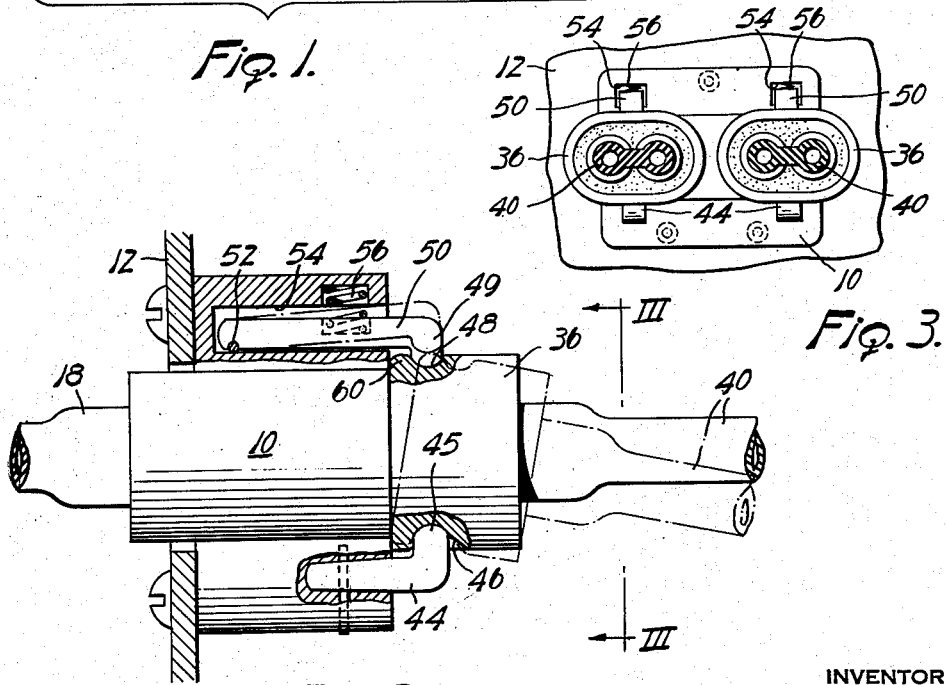
Fig. 2 is a side elevation, partly in section, of the mechanism of Fig. 1, illustrating by means of broken lines the disconnection action.
Fig. 3 is a fragmentary section on a reduced scale taken along line III—III of Fig. 2.

The invention is illustrated in the drawing to comprise a jack insert box type arrangement wherein the insert box portion is designated generally at 10 and is illustrated in Fig. 2 as being mounted upon a wall panel 12 such as may comprise for example a fixed portion of an airplane structure. It will of course be appreciated that the invention is applicable with equal facility to coupling devices for any number of fluid conduits, although in the drawing herewith the device is shown as being arranged to accommodate a pair of duplex conduits for handling compressed air supplies, for example, in aircraft or the like or wherever it is desired to connect a flexible conduit into a permanently fixed jack insert box. The insert box structure may be made of metal or any other suitable material and is suitably bored and tapped to receive the necessary number of conduit connection nipples such as are indicated at 14 in Fig. 1. Each nipple device is formed with a shouldered end portion 16 over which the incoming conduits are press fitted as indicated at 18. The box structure is formed with a rearwardly extending rim 20 which extends in spaced relation from the shank of the nipple portions so as to provide accommodation for elastic locking rings 22 which are subsequently press fitted over the conduits into the box from the rear opening thereof to lock the conduits 18 in position.

The inner ends of the nipples 14 are provided with enlarged chamber portions 24 which accommodate in freely fitted relation therein valve head members 25. Compression springs 26 are disposed within the nipple members to bias the valve head members 25 outwardly thereof. The valve members 25 are formed with seat portions 28, and the reduced shank portions of the valve members are perforated and centrally bored as indicated at 29—30, and a valve seat ring 32 is snugly press fitted and locked into the end of the nipple to engage the valve head 25 for sealing the nipple whenever there is no coupling device in connection with the jack box as illustrated in the lower half portion of Fig. 1.

The jack portion of the coupling device is illustrated in Fig. 1 to comprise a body member 36 formed of metal or other suitable material longitudinally bored and tapped to receive nipple devices 38 in line with corresponding nipple devices 14 of the insert box structure. The nipple devices 38 are similarly formed with shouldered end portions 39 for effective engagement thereon of the duplex conduit device which is designated at 40. At its inner end the body member 36 is counterbored to receive resilient packings 42 encircling each passageway through the body member; the outer face portions of the packings 42 being adapted to abut against the shank end portions of the valve members 25 when the coupling members are forced together toward connected condition. Thus, the packing members 42 force the corresponding valve members 25 to retreat against the action of the springs 26 and away from seated condition relative to the rings 32; whereby when the parts are relatively assembled the valve devices 25 are unseated and fluid is free to flow through the conduit 14 into the conduits 40.

To detachably lock the coupling members together, the stationary housing is provided with a pair of outstanding rigidly mounted fulcrum arms 44 (Figs. 2–3) which terminate in upturned end portions 45 which are of round nose form. The coupling housing portion 36 is correspondingly recessed at its bottom surface as indicated at 46 in Fig. 2, so as to be adapted to engage upon the nose portions 45 of the fulcrum member. At its upper face, the member 36 is also recessed as indicated at 48 to accommodate the downturned nose portions 49 of pivoted latch members 50 which are pivotally mounted as indicated at 52 adjacent their rear ends within recessed portions 54 of the housing member 10.

Compression springs 56 arranged within the housing 10 bias the latch members 50 downwardly toward locking position relative to the housing member 36.

Thus, it will be appreciated that coupling connection of the members 10—36 may be readily accomplished by simply hooking the bottom edge of the coupling member 36 upon the fixed pin heads 45, and thereupon rocking the upper end portion of the member 36 inwardly, thereby camming the latch members 50 upwardly so that the member 36 may be pressed into conduit-sealing and valve-opening position relative to the box member 10. Then, as long as the coupling members 10—36 remain in relatively assembled condition, the conduit passageways are open to permit flow of fluid therethrough. However, in order to disconnect the flexible coupling 40 it is simply necessary to bear downwardly thereon so as to pull the upper edge of the coupling member 36 outwardly while rocking the latter about the fulcrum ends 45, whereupon the coupling member 36 will become quickly disengaged from the member 10 and the valve members 25 will simultaneously close automatically so as to seal off the fluid supply.

Because the locking pin heads 45 extend substantial distances inwardly of the body member 36 when the device is in coupled condition, and because the spring 56 resists upward pivoting of the latch member 50, pull upon the conduit 40 either in an upward or straight out direction will not result in disconnection of the coupling device. It is absolutely necessary that the conduit member 40 be pulled upon in a downward direction such as to the broken line position thereof shown in Fig. 2, before the latch members 50 will be caused to relax their holds upon the body member 36. Thus, it is a particular feature of the invention that any upward pull upon the conduit member 40 is absolutely resisted by the coupling device; particular attention is being called to the fact that any attempt to pull upon the conduit 40 in an upward direction as viewed in Fig. 2 results only in the body member 36 being fulcrumed at its top corner portion 60 against the end wall or face of the body member 10, whereby all of the pulling load is then taken by the finger portions 45 of the rigidly mounted pins 44. Inasmuch as these pin fingers extend substantial distances normally into the body member 36, such upward pulling loads are successfully met by this fulcrum and pin locking action, whereby under such circumstances the coupling device is completely resistant to disconnection.

For example, the coupling device of the invention is particularly adapted to be employed in combination with another quick-disconnect coupling device in the line of the conduit 40 at a position immediately adjacent the fluid supplied device which is fixed to the pilot's body, such as in the case of a parachute assembly including a pneumatic "G" suit or other fluid powered appliance such as necessarily go with the pilot when he leaves the aircraft. Hence, when the pilot prepares to leave the aircraft as for example during an emergency exit, the coupling device of the invention remains connected when the pilot stands up and pulls upon the conduit, whereupon the quick connection device adjacent the pilot's body pulls apart and the pilot will not be trailed by a relatively long conduit member such as would otherwise tend to whip about and injure the pilot during the descent. However, it will of course be appreciated that the coupling device of the invention is equally applicable to many other installations wherever it is required to provide detachable connections in conduit systems such as are readily detached for servicing or other purposes, while being at the same time unopenable except upon intended manipulation thereof.

It will be appreciated that although only one form of the invention has been shown and described in detail, it will be apparent to those skilled in the art that the invention is not so limited but that various changes may be made therein without departing from the spirit of the invention or the scope of the appended claim.

I claim:

A fluid coupling device comprising a box structure adapted to be fixed to a support, the box structure having a first body member of the coupling device supported therein, the box structure having a first recess therein, a fulcrum arm rigidly mounted in the first recess and extended beyond the box structure, the fulcrum arm having an upturned nose portion integral therewith on the extended portion, a second recess in the box structure diametrically opposite to the first recess, a pivoted latch member mounted in the second recess and extended beyond the box structure parallel to the fulcrum arm, the pivoted latch member having a nose portion integral therewith and extended downwardly toward the upturned nose portion of the fulcrum arm, a spring mounted in the second recess and bearing upon the latch member to force the latch member downwardly toward the fulcrum arm, a second body member of the coupling device having a first recess therein engaged by the nose portion of the fulcrum arm and a second recess diametrically opposite the first recess engaged by the nose portion of the latch member, a cam surface on the second body portion adjacent the second recess, the body members of the coupling having bores in alignment to provide a fluid passageway therethrough when the body members are coupled together; one of the body members having a valve seat formed concentrically of its bore and a valve disposed within the bore, spring means in said body normally biasing the valve member into engagement with the valve seat, the other body member being provided with means bearing against and displacing said valve member against the spring means to open the passageway through the body members, whereby the second body member may be coupled to the first body member and the box structure by first engaging the first recess of the second body member with the fulcrum arm and then engaging the nose portion of the latch member with the cam surface of the second body member to force the latch member away from the fulcrum arm against the action of the spring and allowing the nose portion of the latch member to ride over the cam surface into the recess adjacent thereto whereupon the body members will be locked in coupling engagement, and the valve will be forced from the valve seat to open the passageway through the body members.

DONALD V. SUMMERVILLE.

REFERENCES CITED

The following references are of record in the file of this patent:

UNITED STATES PATENTS

| Number | Name | Date |
| --- | --- | --- |
| 176,169 | Davies et al. | Apr. 18, 1876 |
| 407,922 | Brown | July 30, 1889 |
| 2,247,843 | Kamenarovic | July 1, 1941 |